Aug. 14, 1956

E. CLARK 2,759,039

STORAGE BATTERY PLATE SEPARATOR

Filed June 5, 1952

Inventor:
EDWARD CLARK,

By *Myron P. Laughlin*

Attorney

United States Patent Office 2,759,039
Patented Aug. 14, 1956

2,759,039

STORAGE BATTERY PLATE SEPARATOR

Edward Clark, Chicago, Ill.

Application June 5, 1952, Serial No. 291,863

4 Claims. (Cl. 136—148)

This invention relates to storage battery separators and has for its object the provision of an improved type of storage battery separator which may be applied rapidly and at low cost both to new plates and to those rebuilt in the course of battery life.

It is a primary purpose of this invention to provide method and means for creating a battery plate separator from plastic materials which will withstand the attack of the battery acids and physical stresses applied to it in battery construction and operation.

It is a further purpose of this invention to provide a storage battery separator in the form of a plastic coating which may be applied directly to the storage battery plate without the use of cements or joints and which will provide a complete protective covering for the plates before and after the same are installed.

It has been previously proposed that plastic materials be used as battery separators, but such plastics have been in the form of premolded units which had to be assembled around the storage battery plate and cemented at their edges to hold them in place. Such structures have lacked much in economy of construction and in satisfactory structure when completed, so that their use has been neglected by the public. The herein disclosed invention eliminates premolding, assembly of parts and structural weaknesses created by handling such fabricated devices. The separator is created in situ and as a single unit mass surrounding the plate grid and containing within itself any separations from the grid necessary to chemical or mechanical action so that the storage battery cell may actually be made smaller than was heretofore thought necessary.

The herein disclosed invention provides simple and effective means for creating a storage battery separator film from thermoplastic materials heretofore thought inapplicable because of the temperatures and pressures involved in direct application.

The annexed drawing will serve to make clear a preferred embodiment of my invention.

Figure 1:
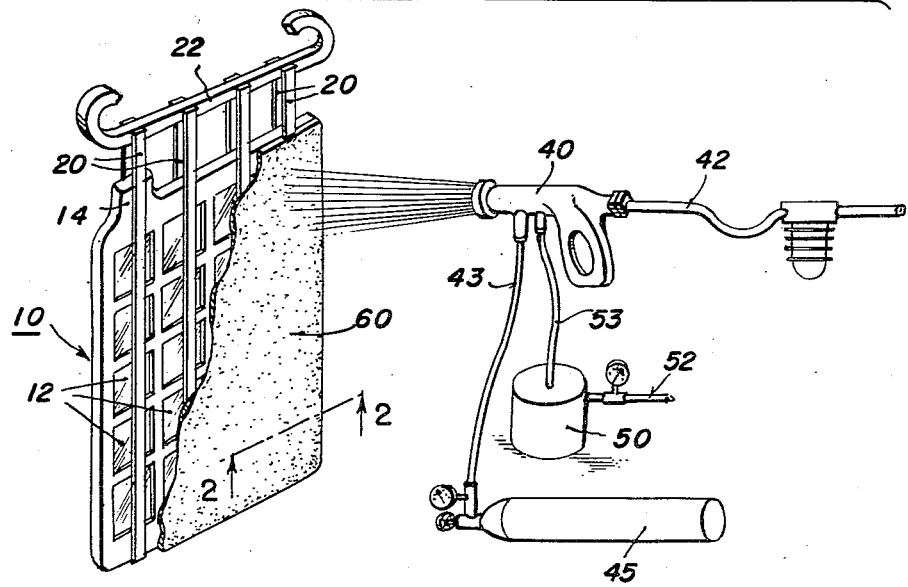
Fig. 1 shows a preferred method of applying the separator to the storage battery grid plate and the apparatus used.

Referring to Fig. 1, 10 indicates the storage battery grid wherein are arranged active material portions 12. Such plates commonly have the terminal posts 14 and are of the general type used in automobile and the like storage batteries. To accomplish my purposes, I provide masking strips or sticks 20 attached to and supported by a holding clamp 22 so that they may be positioned to overlie the storage battery grid and its active material portions as shown. The whole grid and shielding strips are then supported and plastic of the polyethylene type applied through such means as spray gun 40 which may be of any well known pressure type, but which is preferably similar to that known by the trade name of "Agile." These guns are of such construction that the sprayed material reaches the work under considerable pressure which added to the high velocity of the sprayed material particles assures an impact pressure at point of application and a compacted material deposit more dense than that obtained by fluid molding. In such guns, compressed air is commonly used as the ejecting and combustion supporting fluid being supplied through such means as pipe 42 from a suitable compressor. A combustible gas is also supplied to the gun through such means as tubing 43 connecting with gas cylinder 45, while the powdered plastic material is drawn from a pressure reservoir 50. Pressure is applied to reservoir 50 through such means as pipe 52 and the powdered plastic is forced through tube 53 to the spray gun 40. The nozzle, internal valves, mixer and other mechanism of such guns are of a type and arrangement well known to the art of metal and plastic spraying.

In the practice of my process I have found it preferable to preheat the storage battery grid to temperatures of 200 to 350° F. and then to place the grid in a substantially vertical position, as shown, with the masking strips 20 thereover and to quickly spray the polyethylene plastic thereover at a temperature slightly in excess of 240° F. thus providing a coating substantially as shown at 60, it being understood, however, that both the temperature of preheat and the temperature of application are dependent on the surrounding conditions and the chemical and thermal characteristics of the particular plastic material used and the brand and batch thereof. The form of the grains in the plastic powder employed has also been found to be important in obtaining the best effects and preference is here given to the spherical shape as more active under pressure, rather than to the flat or flake type, although I do not restrict my process to such grain type and the process may be practiced with other powder structures.

Figure 2:
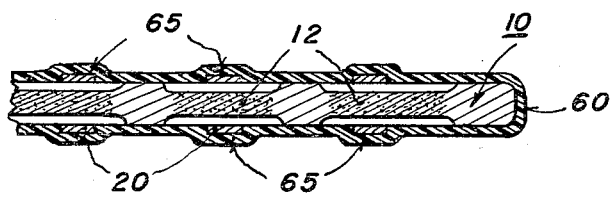
Fig. 2 is a cross section taken on line 2—2 of Fig. 1 looking in the direction of the arrows.
Figure 3:
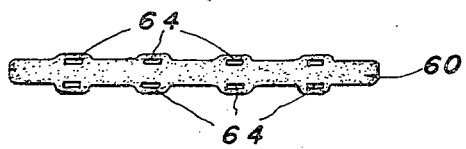
Fig. 3 is a bottom view of the complete storage battery plate with the separator thereon.

It will, of course, be understood that upon coating one side of the plate it may be quickly reversed and the other side coated until the whole plate, with the exception of the terminal post 14, has been coated. Masking strips 20 are withdrawn (by manipulation of the clamp 22) providing a plurality of openings 64 at the top and bottom of the envelope as shown in Fig. 3 for the ready ingress and egress of electrolyte from the storage battery cell, while at the same time providing vertical valleys or channels as indicated at 65 in Fig. 2 for the ready flow of electrolyte and current to the active material of the grid and for the escape of generated gases therefrom.

What I claim is:

1. A storage battery separator of polyethylene thermoplastic applied under flame heat and pressure to the battery grid and to masking strips arranged thereover, said masking strips being withdrawn after said application to provide channels and openings in said separator for battery, fluid and current flow.

2. Plastic storage battery plate separator method of construction which includes applying spaced withdrawable shields over portions of the plate, a plastic coating flame sprayed to apply plastic over said plate and said shields under impact and the then withdrawing of said shields to provide channels in the plastic over the plate surface.

3. The method of providing plastic separators for storage battery plate grids which comprises preheating the grids, applying strip shields to the heated grid, flame spraying polyethylene plastic over said grid and shields under impact pressure to form a continuous impacted coating thereover, then withdrawing said shields to provide access openings and channels to the grid material.

4. A storage battery plate separator of flame sprayed polyethylene plastic built up in multiple impacted layers on the battery plate surface, said separator having electrolyte access openings and channels therein to provide passage for battery fluids and currents to reach the active plate material.

References Cited in the file of this patent

UNITED STATES PATENTS

| | | |
|---|---|---|
| 1,639,280 | Benner et al. | Aug. 16, 1927 |
| 2,047,179 | De Marthis et al. | July 14, 1936 |
| 2,184,373 | Adams | Dec. 26, 1939 |
| 2,410,225 | Macht | Oct. 29, 1946 |
| 2,490,630 | Jardine | Dec. 6, 1949 |
| 2,643,955 | Powers et al. | June 30, 1953 |